United States Patent [19]
Tanaka

[11] 3,974,019
[45] Aug. 10, 1976

[54] APPARATUS FOR MANUFACTURING PLASTIC PIPES

[75] Inventor: Kenichi Tanaka, Musashino, Japan

[73] Assignee: Kakuichi Mfg. Co., Ltd., Ueda, Japan

[22] Filed: May 29, 1974

[21] Appl. No.: 474,344

Related U.S. Application Data

[63] Continuation of Ser. No. 265,448, June 23, 1972, abandoned.

[30] Foreign Application Priority Data

Feb. 29, 1972 Japan................................ 47-20198

[52] U.S. Cl................................ 156/429; 156/500
[51] Int. Cl.² ................... B29D 23/04; B29D 23/12
[58] Field of Search ........... 156/184, 189, 195, 244, 156/304, 425, 429, 448, 500; 138/129, 132, 154

[56] References Cited
UNITED STATES PATENTS

| 1,674,171 | 6/1928 | Gammeter et al. | 156/195 |
| 2,398,876 | 4/1946 | Bailey | 156/189 |
| 2,722,263 | 11/1955 | Beare et al. | 156/195 |
| 3,325,327 | 6/1967 | Swan | 156/189 |
| 3,416,982 | 12/1968 | Petzetakis | 156/195 |
| 3,441,459 | 4/1969 | Weidel | 156/195 |
| 3,532,580 | 10/1970 | Kanao | 156/432 |
| 3,548,882 | 12/1970 | Rinker | 156/187 |
| 3,671,348 | 6/1972 | Kemsey-Bourne | 156/195 |
| 3,679,508 | 7/1972 | Weidel | 156/191 |
| 3,682,746 | 8/1972 | Helmick et al. | 156/429 |
| 3,706,624 | 12/1972 | Rinker | 156/189 |

FOREIGN PATENTS OR APPLICATIONS

3,613,932   8/1961   Japan

*Primary Examiner*—Douglas J. Drummond
*Assistant Examiner*—Basil J. Lewris
*Attorney, Agent, or Firm*—Stevens, Davis, Miller & Mosher

[57] ABSTRACT

An apparatus for continuously manufacturing a reinforced plastic pipe in which a reinforced plastic strip having a substantially I-shaped reinforcing spiral core embedded therein and partly exposed out of the strip is wound on at least three segmental sleeves slidably mounted on rotary shafts whose centers are arranged at vertexes of a regular polygon, respectively. During rotation of the rotary shafts, those segmental sleeves which are in contact with an envelope that is tangent to the segmental sleeves are moved forward while those segmental sleeves which are not in contact with the envelope are moved backward in a smooth manner by a guide means. The alternate forward and backward movements of the segmental sleeves are capable of continuously manufacturing the reinforced plastic pipe without producing strain at the joints between the lateral edges of the successive turns of the plastic pipe.

2 Claims, 9 Drawing Figures

FIG_4
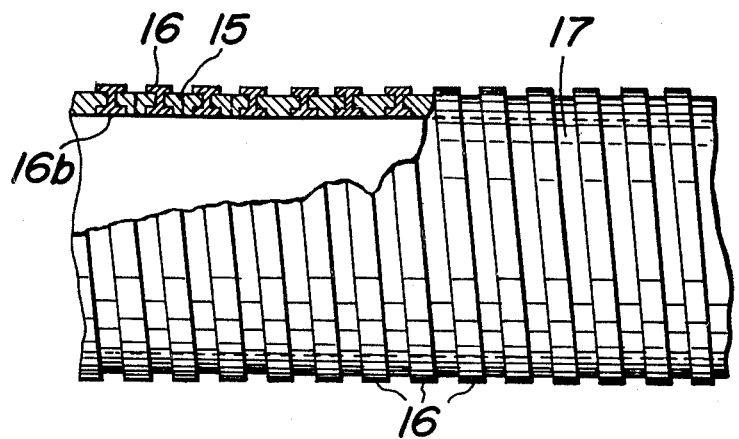
FIG_5
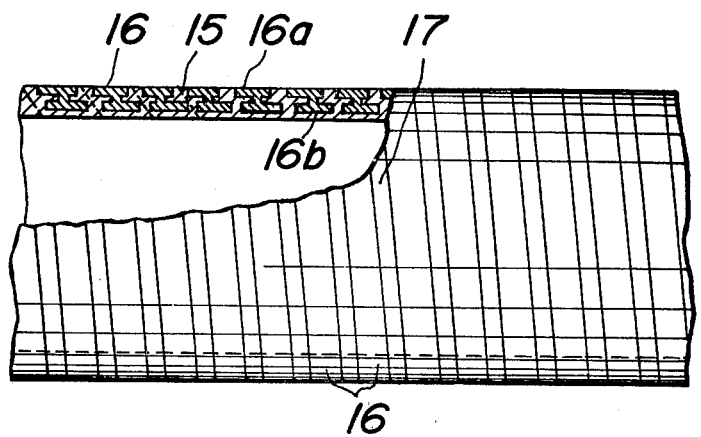

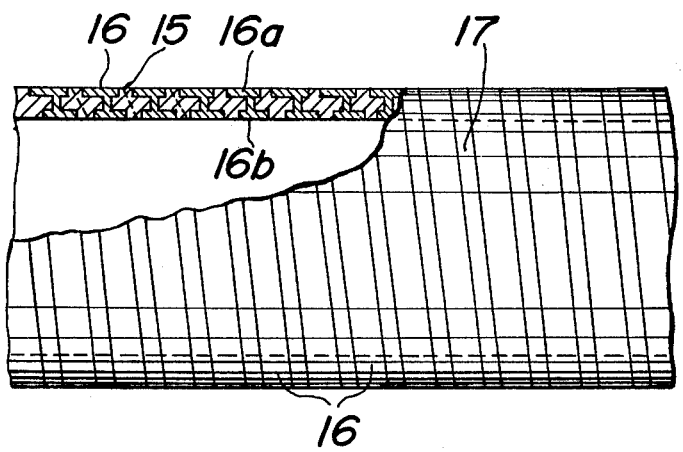
FIG_6
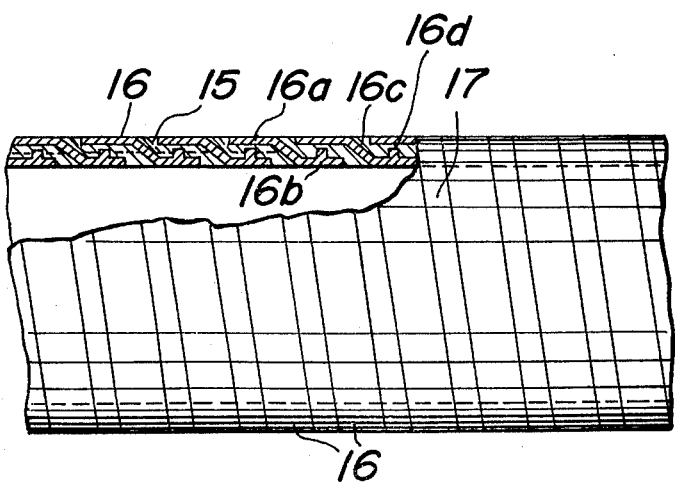
FIG_7

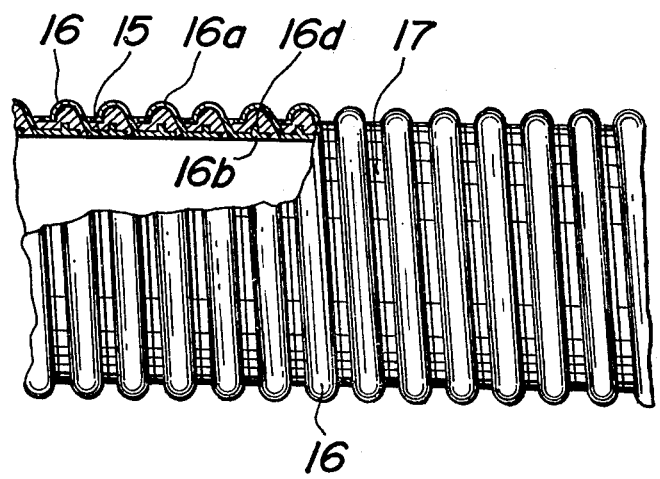

APPARATUS FOR MANUFACTURING PLASTIC PIPES

This is a continuation of application Ser. No. 265,448, filed 6-23-72 now abandoned.

This invention relates to apparatus for manufacturing plastic pipes, and more particularly to an apparatus for continuously manufacturing a reinforced plastic pipe which is flexible and has a substantially I-shaped reinforcing spiral core embedded therein and partly exposed out of the pipe wall.

Many attempts have, heretofore, been made to provide the above mentioned kind of apparatus, but hitherto none has led to provide a fully satisfactory apparatus.

Heretofore, it has been proposed to manufacture the above mentioned kind of reinforced plastic pipe by an apparatus comprising a rotatably mounted mandrel, a plurality of segmental sleeves arranged to surround the mandrel side by side and adapted to rotate with and slidably move along the mandrel, and a cam device to move forward the majority of the segmental sleeves and move backwards a few of the segmental sleeves, and in which a plastic tape having a reinforcing core embedded therein is helically wound around the segmental sleeves. In this conventional apparatus using, for example, 12 segmental sleeves, 10 of which are moved forward while two of which are moved backward. Since the plastic pipe being formed is closely adhered to the segmental sleeves, it is difficult in practice to move backward the two segmental sleeves in a rapid and smooth manner without being influenced by the adhesive effect of the plastic pipe being formed upon the segmental sleeves. In order to eliminate the friction between the backward moving segmental sleeves and the pipe being formed, provision must be made for means to retract the backward moving segmental sleeves into the mandrel, thereby separating these segmental sleeves from the pipe being formed. Such means, however, are considerably difficult to construct from a technical standpoint and moreover the apparatus becomes complex in construction.

In order to obviate such disadvantages, another apparatus for manufacturing the above mentioned kind of reinforced plastic pipe has been proposed, in which provision is made of a plurality of bar-shaped rollers each adapted to be rotated by a flexible shaft and rotatably supported at its one end, another free end of all of the rollers being diverged to form a cone-shaped roller as a whole, and a plastic tape having a reinforcing core embedded therein is helically wound around the cone-shaped roller. This conventional apparatus, however, has the disadvantage that the use of the cone-shaped roller results in an outward elongation of the plastic tape being helically wound, which will produce strain at the joints between the successive turns of the plastic tape that will cause the pipe to wear during operation and hence cause the pipe to shorten its useful life, and that the lateral edges of the adjacent turns of the tape must be overlapped, which will also produce the strain at the overlapped joints.

An object of the invention is to provide an apparatus which is simple in construction and reliable and smooth in operation and capable of continuously manufacturing a reinforced plastic pipe having improved compressive stress and abrasive wear resistant properties.

Another object of the invention is to provide such an apparatus having a guide means to move forward and backward segmental sleeves so as to helically wind a reinforced plastic tape around these segmental sleeves in an extremely smooth manner.

A further object of the invention is to provide such an apparatus in which a reinforced plastic pipe can be manufactured by butt welding the lateral edges of the successive turns of the plastic strip without producing any strain at the jounts.

A feature of the invention is the provision of such an improved apparatus for manufacturing reinforced plastic pipes comprising a supporting frame, at least three rotary shafts each arranged horizontally and rotatably journaled at its one end by the supporting frame and having along its free end a splined portion, the centers of the rotary shafts being arranged at vertexes of a regular polygon, respectively, means to rotate the rotary shafts at the same speed in the same direction, at least three segmental sleeves each having a groove into which the ridge of the splined portion fits slidably, and means to guide the segmental sleeves in a manner such that each segmental sleeve which makes contact with an envelope that is tangent to the segmental sleeves moves towards the free end of the rotary shaft and each segmental sleeve which does not make contact with the envelope moves towards the supported end of the rotary shaft, a feeding means for supplying a continuous reinforced plastic strip having a substantially I-shaped reinforcing core embedded therein and partly exposed out of the plastic strip to those portions of the segmental sleeves which are near the supporting frame whereby rotation of the rotary shafts at the same speed in the same direction and continuous supply of the plastic strip produce a helical advance of the plastic strip and thermal adherence of the lateral edges of the successive turns of the advancing strip in abutting relation forms an elongated reinforced plastic pipe.

In the apparatus according to the invention, during its operation the rotary shafts are rotated through a gear means by a driving motor at the same speed in the same direction and the reinforced plastic strip is continuously supplied onto the forward moving segmental sleeves whereby the plastic strip is caused to be spirally wound around the segmental sleeves. The guide means is capable of abutting and welding the lateral edges of the successive turns of the plastic strip, thereby forming an extended reinforced plastic pipe.

In the present invention, it is preferable to use a guide means of a pin-groove connection comprising a pin projected from each segmental sleeve and a rhombus-shaped groove cut in the inner wall of the supporting frame. It is preferable to use four rotary shafts and four segmental sleeves from constructional and operational standpoints.

The above and other features and objects of the invention will become more apparent from the following description and accompanying drawings, in which:

FIG. 1a is a perspective view of a reinforced plastic strip;

FIGS. 4 to 8 are front elevations and partly sectional views of modified reinforced plastic pipes manufactured by the apparatus according to the invention.

Figure 1:
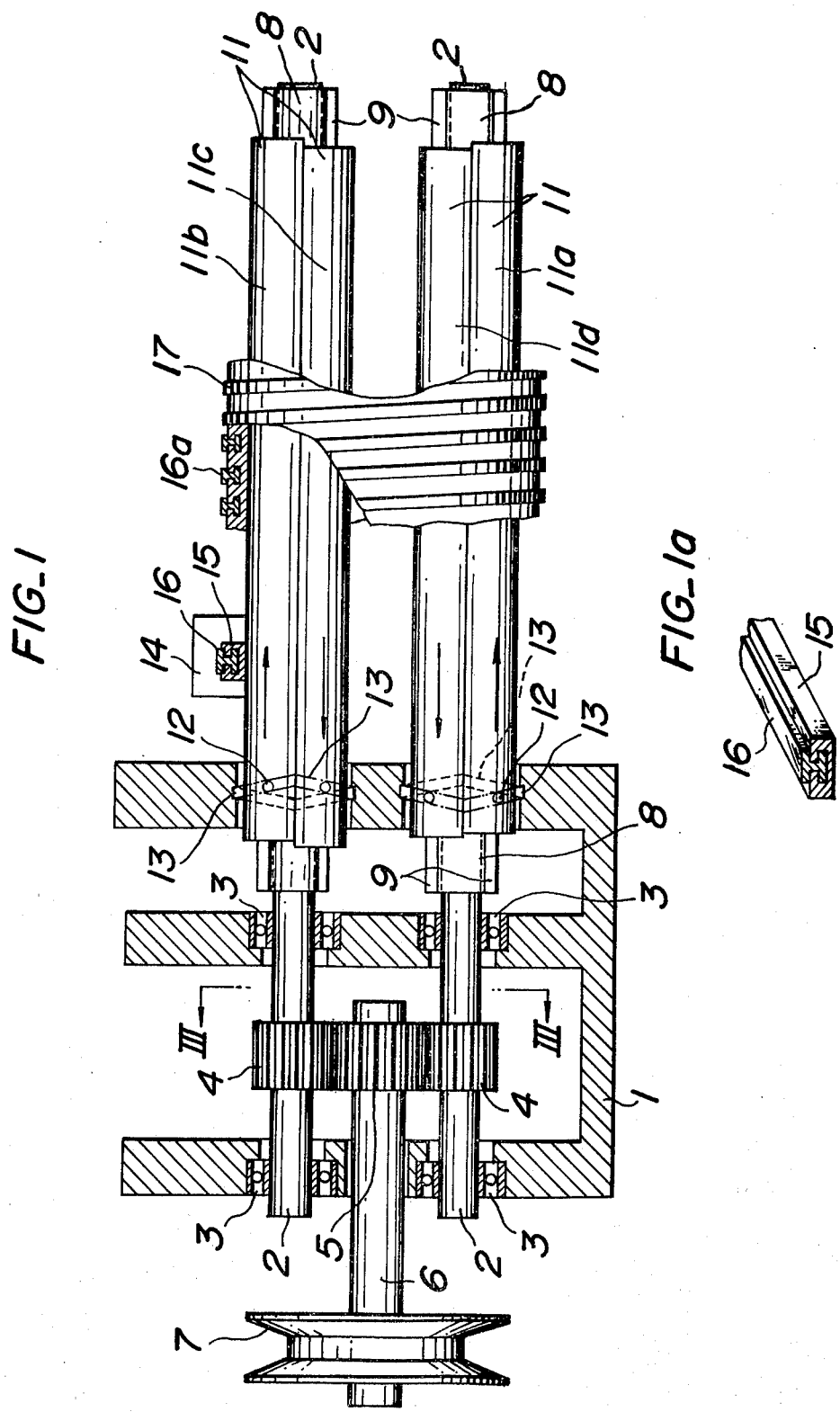
FIG. 1 is a front elevation and partly a sectional view of an apparatus according to the invention, two of the rotary shafts being not shown for ease in illustration.
Figure 2:
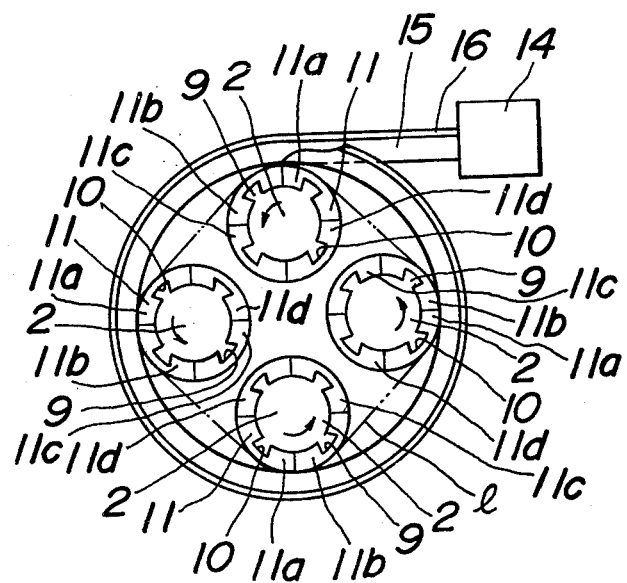
FIG. 2 is an end view of FIG. 1 seen from the right side thereof, the supporting frame being not shown for ease in illustration.

Referring to FIG. 1, reference numeral 1 designates a supporting frame for supporting four rotary shafts 2. Each rotary shaft 2 is arranged horizontally and the center axis thereof is positioned at the vertex of a square as shown in FIG. 2 and rotatably journaled in bearings 3 mounted in the supporting frame 1. To each rotary shaft 2 is secured a gear 4 which is threadedly engaged with a gear 5 secured to one end of a driving shaft 6 having at another end a pulley 7 secured thereto and adapted to be driven through a belt (not shown) by a motor (not shown). The driving shaft 6 with the gear 5 is positioned at the center of the square at which vertexes are arranged the four rotary shafts 2 and the gears 4, respectively, and as a result, the rotations of the driving shaft 6 ensure the rotation of all of the rotary shafts 2 at the same speed in the same direction.

Each rotary shaft 2 is provided along its free end, that is, along that portion which is opposite to the portion supported by the supporting frame 1 with a splined portion 8 having four equidistant dove-tail ridges 9. The four dove-tail ridges 9 are slidably fitted in four grooves 10 formed in four segmental sleeves 11, respectively, so as to form a cylinder as a whole concentric with the rotary shaft 2 as shown in FIG. 2.

Each segmental sleeve 11 is provided at that portion which is supported by the supporting frame 1 with a pin 12 adapted to be slidably engaged with a rhombus-shaped groove 13 cut in the inner wall of the bore of the supporting frame 1. The pin 12 and the rhombus-shaped groove 13 form means for guiding the segmental sleeves 11.

The guide means 12, 13 is required to guide the segmental sleeves 11 in a manner such that each segmental sleeve 11a, 11b (FIG. 2) which makes contact with an envelope l that is tangent to the four segmental sleeves 11 moves toward the free end of the rotary shaft 2 and each segmental sleeve 11c, 11d which does not make contact with the envelope l moves toward the supported end of the rotary shaft 2. The guide means is not limited to the embodiment as above described, use may be made of any modified guide means for satisfying the above mentioned requirements.

IN FIGS. 1 and 2, reference numeral 14 designates a feeding device for supplying a continuous plastic strip 15 having a reinforcing core 16 embedded therein and partly exposed out of the strip 15.

The apparatus constructed as above described will operate as follows.

Figure 3:
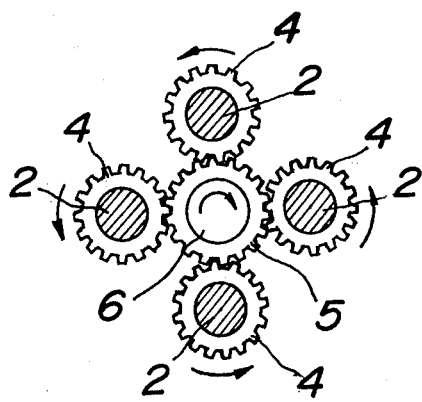
FIG. 3 is a section on line III—III of FIG. 1, the supporting frame being not shown.

If the driving shaft 6 is rotated in a clockwise direction shown by an arrow in FIG. 3, all of the rotary shafts 2 and segmental sleeves 11 are rotated in a counter-clockwise direction shown by an arrow in FIGS. 2 and 3. Onto the rotating and forward moving segmental sleeves 11a, 11b is supplied from the feeding device 14 the semi-molten plastic strip 15 having I-shaped reinforcing core 16 partly exposed out of the strip 14 after it has been formed by an extrusion process. The rotation of the segmental sleeves 11 causes the plastic strip 15 supplied and adhered thereto to bend so as to surround the segmental sleeves 11 and rotate together with them. Those segmental sleeves 11a and 11b (FIG. 2) which make contact with the envelope l are moved forward or toward the free ends of the rotary shafts 2, and as a result, the plastic pipe 17 being formed is also moved forward (to the right in FIG. 1) and helically wound around the segmental sleeves 11. The segmental sleeves 11c and 11d which do not make contact with the envelope l are moved backward or toward the supported ends of the rotary shafts 2. These segmental sleeves 11c and 11d are not in contact with the inner wall of the plastic pipe 17 being formed so that they can be moved backward in a smooth manner without forming any strain at the butt joints formed by the adjacent lateral edges of the successive turns of the plastic pipe 17 being formed.

The width (pitch) of the plastic strip 15, the strip supplying speed from the feeding device 14, the rotating speed of the rotary shaft 2 and the forwards and backwards moving speeds of the segmental sleeves 11 are adjusted such that the successive turns of the plastic strip 15 are caused to be joined at the lateral edges thereof as shown by dotted lines in FIG. 1 and then thermally melted together to form a reinforced plastic pipe 17 as partly shown in FIG. 1.

If the plastic strip supply speed from the feeding device 14 is made equal to the rotating speed of the plastic pipe 17 being formed, there is no risk of the plastic strip 15 being at first deformed into a square contour defined by the envelope l of the segmental sleeves 11 and then formed into a circular contour or conversely there is no risk of the plastic strip 15 being deformed from the circular contour into an irregular circle, which will produce strain at the joints between the successive turns of the plastic pipe 17. It may be clear that the above mentioned adjustment of the width of the plastic strip 15, the plastic strip supplying speed, the rotating speed of the rotary shafts 2 and the forward and backward movements of the segmental sleeves 11 may easily be carried out by those skilled in the art.

As stated hereinbefore, the apparatus according to the invention makes it possible to continuously manufacture an elongated reinforced plastic flexible pipe having a given pitch and outer and inner diameters. If it is desired to change the pitch or the diameter of the plastic pipe 17 formed, the pin-groove connection 12, 13 or the rotary shafts 2 may be replaced by new ones having desired dimensions or the supporting frame 1 may be modified so as to change the arrangement of the rotary shafts 2.

The reinforced plastic strip 15 may be made of synthetic resin such, for example, as vinyl chloride and formed by an extrusion method. The plastic strip 15 per se may be made of a soft synthetic resin material and the reinforcing core 16 may be made of a hard synthetic resin material. It is preferable to use the reinforced plastic strip 15 in a semi-molten state which is obtained immediately after it has been extruded.

In the present embodiment, the upper leg 16b of the I-shaped core 16 is projected out of the strip 17 so that compressive stress and wear resistant properties can be improved.

Another embodiments of the reinforced plastic pipe 17 manufactured by the apparatus according to the invention are shown in FIGS. 4 to 7. In FIG. 4 is shown a reinforced plastic pipe 17 in which the lower leg 16b of the I-shaped core 16 is made flush with the inner wall of the plastic pipe 17. In FIG. 5 is shown a reinforced plastic pipe 17 in which the upper and lower legs 16a and 16b of the I-shaped core 16 are made relatively wide and the upper plastic pipe 17 flush with leg 16a is exposed out of the outer surface of the latter. In the present embodiment, the upper and lower legs 16a and 16b of the I-shaped core 16 are displaced in opposite directions, respectively.

The lateral edges of the strip 15 are inclined as shown by dotted lines in FIG. 5 by an angle determined by the modified configuration of the I-shaped core 16. The wide width of the upper and lower legs 16a and 16b of the I-shaped core 16 ensures improved compressive stress and abrasion resistant properties. In FIG. 6 is shown a reinforced plastic pipe 17 in which both the upper and lower legs 16a and 16b of the I-shaped core 16 are made flush with the outer and inner walls of the pipe 17 and exposed out of it, respectively. In FIG. 7 is shown a reinforced plastic pipe 17 in which the opposite ends of the upper and lower legs 16a and 16b of the I-shaped core 16 are connected by an inclined web 16c and the lower leg 16b is provided with a rib 16d projecting towards the upper leg 16a. Both the upper and lower legs 16a and 16b are flush with the outer and inner wall surfaces of the pipe 17 and exposed out of the latter, respectively. In FIG. 8 is shown a reinforced plastic pipe 17 in which the upper leg 16a of the I-shaped core 16 is made semi-circle in section and exposed out of the outer wall surface of the pipe 17 and the lower leg 16b is provided with a rib 16d as in the embodiment shown in FIG. 7. In the embodiments shown in FIGS. 7 and 8, the rib 16d facilitates bonding of the reinforcing core 16 firmly to the plastic strip 15. The rib 16d may be formed on the upper leg 16a or on both the upper and lower legs 16a and 16b, respectively.

The reinforced plastic pipes having various modified I-shaped cores 16 manufactured by the apparatus according to the invention have improved compressive stress and abrasive wear resistant properties without involving a risk of undue decrease of flexibility thereof.

As described above, the apparatus according to the invention has the advantages that alternate forward and backward movements of the segmental sleeves 11 can be effected in an extremely smooth manner, and as a result, there is no danger of producing strain at the joints between the lateral edges of the successive turns of the plastic strip 15, and a plastic pipe 17 having a reinforcing core 16 embedded therein and partly exposed out of the pipe wall may continuously be manufactured. Therefore, the invention contributes greatly to the industry.

The embodiments of the invention shown in the drawings are for the purpose of describing the objects and features of the present invention. It is to be understood, however, that modifications, changes and alternations may be made without departing from the scope and spirit of the invention.

What is claimed is:

1. An apparatus for continuously manufacturing a reinforced plastic pipe which is flexible and has a substantially I-shaped reinforcing spiral core embedded therein and partly exposed out of the pipe wall, comprising a supporting frame, at least three positively driven shafts arranged parallel to each other and rotatably journaled at one end by said supporting frame, the centers of said positively driven shafts being arranged at vertexes of a regular polygon, respectively; a driving motor connected through gears for driving all of said positively driven shafts at the same speed in the same direction; at least three segmental sleeves slidably fitted around each of said driven shafts and each having a pin slidably engaged with a rhombus-shaped groove cut in the inner wall of a bore in said supporting frame; with the arrangement of said shafts being such that the exterior surface of said sleeve portions are internally tangential to the path of the interior surface of a pipe to be manufactured thereon, and means for axially moving each segmental sleeve portion on each shaft such that each sleeve portion is moved axially away from said supporting frame when that sleeve portion is internally tangential to said path, and is moved axially toward said frame when it is not internally tangential to said path and a feeding device for supplying a continuous reinforced plastic strip, which strip has a substantially I-shaped reinforcing core embedded therein and partly exposed out of said plastic strip, to those portion of said segmental sleeves which are near said supporting frame, whereby rotation of said driven shafts, axial movement of said segmental sleeves and continuously supplying of said plastic strip produces a helical advance of said plastic strip away from the supporting frame and thermal adherence of the lateral edges of successive turns of the advancing strip in abutting relation substantially throughout the overall periphery thereof to form an elongated reinforced plastic pipe.

2. The apparatus as claimed in claim 1, including four positively driven rotary shafts having segmental sleeves.

* * * * *